United States Patent [19]
Kim

[11] Patent Number: 5,884,185
[45] Date of Patent: Mar. 16, 1999

[54] CORDLESS TELEPHONE HAVING A CALL KEY CAPABLE OF PERFORMING MULTIPLE FUNCTIONS AND A METHOD FOR ASSIGNING ALTERNATE FUNCTIONS TO THE CALL KEY AND PERFORMING THE MULTIPLE FUNCTIONS

[75] Inventor: Jong-Kwang Kim, Gumi, Rep. of Korea

[73] Assignee: SamSung Electronics Co., Ltd., Kyungki-do, Rep. of Korea

[21] Appl. No.: 698,895

[22] Filed: Aug. 16, 1996

[30] Foreign Application Priority Data

Aug. 16, 1995 [KR] Rep. of Korea ................. 1995 25167

[51] Int. Cl.[6] .................. H04Q 7/32; H04M 1/00
[52] U.S. Cl. .................. 455/550; 455/575; 455/425; 379/433; 379/428
[58] Field of Search ................. 455/90, 403, 425, 455/550, 575; 379/433, 434, 428, 368; D14/138

[56] References Cited

U.S. PATENT DOCUMENTS

| | | | |
|---|---|---|---|
| 4,845,772 | 7/1989 | Metrika et al. ................. | 379/433 |
| 5,151,946 | 9/1992 | Martensson ................. | 455/550 |
| 5,220,594 | 6/1993 | Ohnishi et al. ................. | 455/412 |
| 5,251,250 | 10/1993 | Obata et al. ................. | 455/412 |
| 5,278,993 | 1/1994 | Reiff et al. ................. | 379/433 |
| 5,327,584 | 7/1994 | Adachi et al. . | |
| 5,365,570 | 11/1994 | Boubelik ................. | 379/433 |
| 5,384,844 | 1/1995 | Rydbeck . | |
| 5,561,436 | 10/1996 | Phillips ................. | 455/575 |
| 5,572,575 | 11/1996 | Yamamoto et al. ................. | 455/412 |
| 5,615,251 | 3/1997 | Gilbert ................. | 379/434 |
| 5,638,441 | 6/1997 | Hattori et al. ................. | 379/434 |

*Primary Examiner*—Dwayne D. Bost
*Assistant Examiner*—Jean A. Gelin
*Attorney, Agent, or Firm*—Robert E. Bushnell, Esq.

[57] ABSTRACT

A method for performing multiple functions by using a call key of a handset in a cordless telephone comprising the steps of checking whether a handset is in a standby state; if it is checked that a handset is in a standby state, opening a flip switch; inputting a function key to be set; checking the input of the function key; if it is checked that the function key is input, storing the input function in a memory; converting the state into a standby state; checking whether a ring is received in the standby state; inputting the call key when the ring is received to then form a general call; and if the ring is not received in the standby state, inputting the call key and performing the predetermined function.

11 Claims, 4 Drawing Sheets

CORDLESS TELEPHONE HAVING A CALL KEY CAPABLE OF PERFORMING MULTIPLE FUNCTIONS AND A METHOD FOR ASSIGNING ALTERNATE FUNCTIONS TO THE CALL KEY AND PERFORMING THE MULTIPLE FUNCTIONS

CLAIM OF PRIORITY

This application makes reference to, incorporates the same herein, and claims all benefits accruing under 35 U.S.C §119 from an application entitled *Method For Performing Multiple Functions Using A Call Key Of A Handset In A Cordless Telephone* earlier filed in the Korean Industrial Property Office on 16 Aug. 1995, and was there duly assigned Ser. No. 25167/1995 by that Office.

BACKGROUND OF THE INVENTION

1. Field of the Invention

The present invention relates to a wireless telephone generally, and, more particularly, to a wireless telephone having a call key or talk key, installed in a handset thereof, capable of performing multiple functions and a method for setting up the call key and performing those multiple functions.

2. Description of the Related Art

Currently, in accordance with the development in the communication technology, various service functions of a communication system are frequently requested by telephone owners and service subscribers. Also, calling methods for telephones used in offices are varied. One group of telephones is called "wireless" because they are connected to a base station by radio link instead of by a wired link. The term wireless telephone pertains to a cordless telephone, a cellular telephone, mobile telephone or radiotelephone.

Regarding the cordless telephone, it is used an extension telephone in a home or business, and generally has two parts—a base unit and a portable unit. In one type of cordless telephone the portable unit, also known as a handset, houses a keypad. A conventional handset housing a keypad of a cordless telephone having a flip-type cover, or lid, colloquially known as a flip, and a flip switch is known as a portable telephone or flip-phone. In exemplars of conventional practice such as the *Portable Radio Having Cover Releasing Mechanism and Receive Switch Which are Operable Together* of Adachi, et al. U.S. Pat. No. 5,327,584, and the *Pivotable Housing for Hand-Held Transceiver* of Nils R. Rydbeck, U.S. Pat. No. 5,384,844. When the flip is closed the flip switch is also closed and the cordless telephone is usually in standby mode, which corresponds to the on-hook condition of a telephone set. When the flip is closed, only the call key (or talk key) is accessible. In order for a user to get the cordless telephone to perform various other functions, such as a redial function and an intercom function, the flip needs to be opened to establish an off-hook condition and the call key has to be activated before activating the function key for the desired function to be performed. Additionally, in such a handset, if there is an incoming call when the flip of the handset is closed, only the function of answering the call can be performed by pressing the call key.

SUMMARY OF THE INVENTION

Therefore, it is an object of the present invention to provide an improved cordless telephone.

It is another object to provide portable cordless telephone having a call key for performing multiple functions when a flip-type lid of the portable cordless telephone is closed.

It is also an object to provide a method for setting up a call key, of a portable cordless telephone, for performing multiple functions.

It is a further object to provide a method of implementing various functions by a user's simple manipulation of a call key to variably convert the call key into an intercom key and a redial key without opening a flip of a portable cordless telephone.

To accomplish these and other objects, there is provided a cordless telephone with a portable handset having a flip and key pad, wherein a call key of the keypad is accessible when the flip is in a closed position. The call key is set up to perform various functions by checking whether the handset is in a standby state; opening a flip switch when the handset is in the standby state to begin an operating state; inputting a function key to be set; detecting the input of the function key; setting up the call key to perform the function corresponding to the input function key by storing the input function in a memory; and converting the state of the handset back into a standby state. In order to use the call key to perform various functions a processor checks whether a ring is received during the standby state, checks for activation of the call key when the ring is received in order to receive a call, and if the ring is not received during the standby state, checks for activation of the call key in order to perform the function stored in memory.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
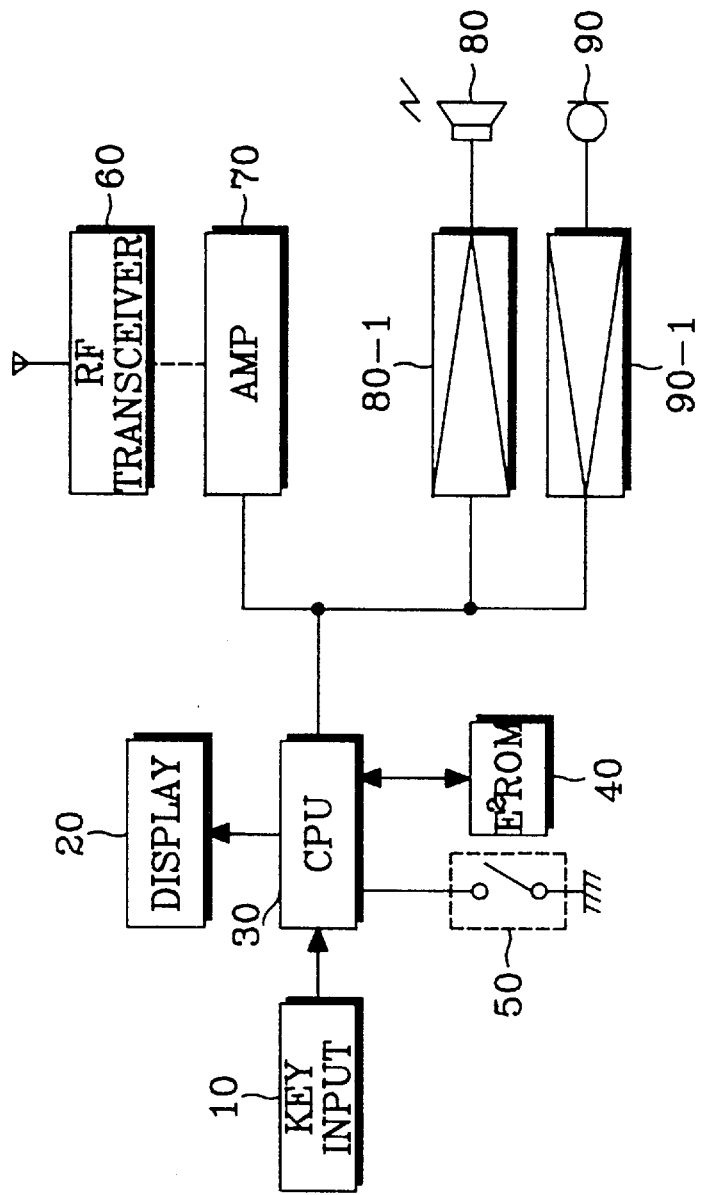
FIG. 1 is a block diagram of a handset circuit for a cordless telephone constructed according to the principles of the present invention.

Turning now to the drawings and referring to FIG. 1, a handset circuit of a cordless telephone according to the present invention includes a key input unit 10 having numeric keys and various function keys including a call key for generating a call signal in order to answer a received telephone call, a display unit 20 for displaying a system operating state, a controller 30 for performing predetermined operations by detecting signals generated by key input unit 10 in response to activation of the numeric keys and function keys, a memory 40 for storing functions controlled by activation of the call key, wherein the stored functions are set in response to a control signal of controller 30 in response to a function key signal input from key input unit 10 during a call key setup mode, a flip switch 50 serving as a hook switch for establishing an off-hook or on-hook condition of the handset according to whether the flip is open or closed, respectively, an RF transceiver 60 for processing a signal transmitted/received by radio, an amplifier 70 for amplifying a weak transmission/reception signal, an amplifier 80-1 for amplifying an audio signal output to a speaker 80, a microphone 90 and an amplifier 90-1 for amplifying a speech signal input via microphone 90.

Figure 2:
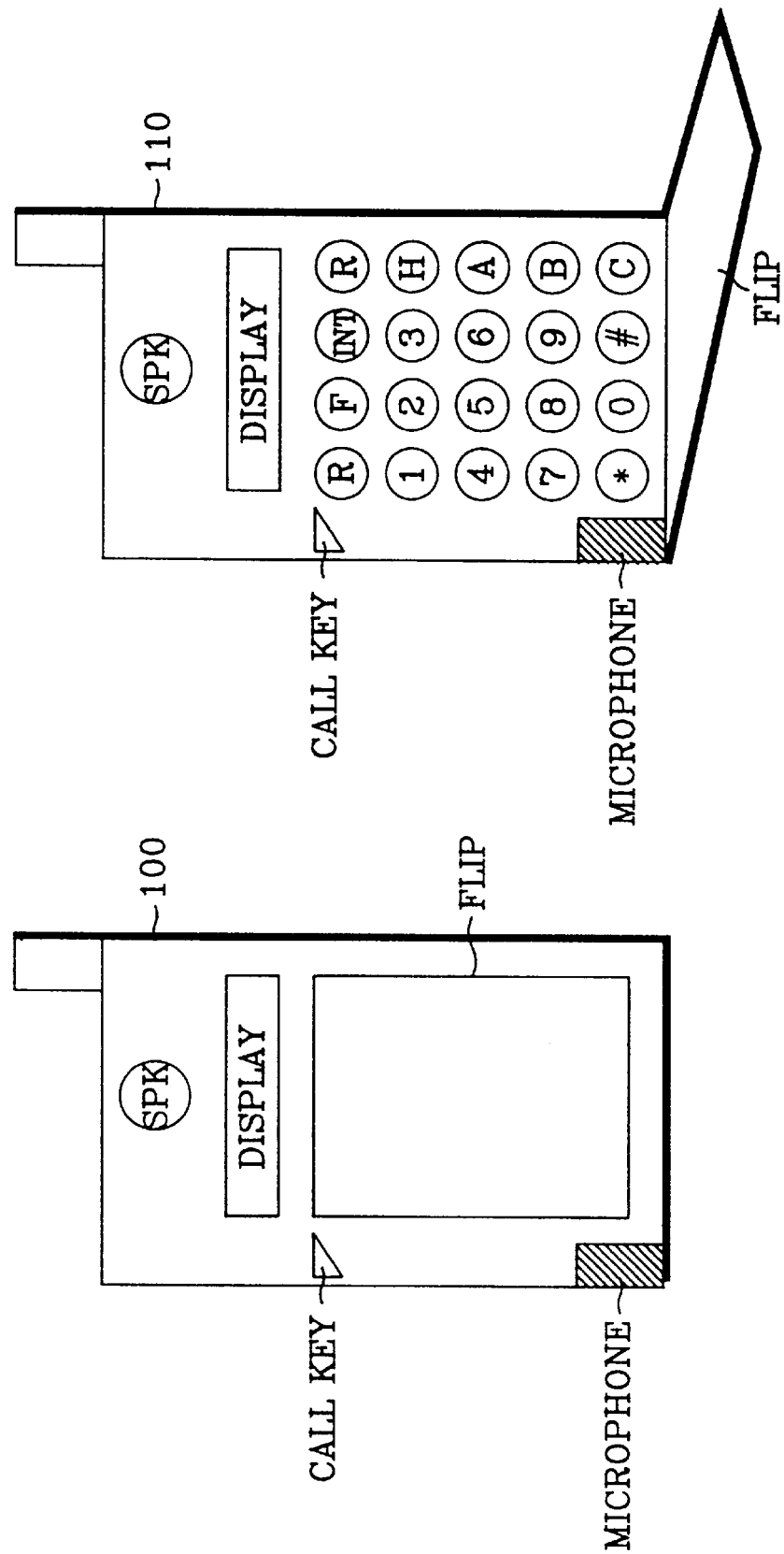
FIG. 2A and 2B are external perspective views illustrating structural features of the handset of the cordless telephone constructed according to the principles of the present invention.

FIGS. 2A and 2B show external perspective views of the cordless telephone handset 100 according to the present invention. In FIG. 2A handset 100 is shown having a flip in a closed (on-hook) position leaving only the speaker SPK, display, microphone and one function key, ie., the call key, exposed or accessible to the user. In FIG. 2B handset 100 is shown with the flip in the open (off-hook) position thus allowing the user access to the numeric keys and the rest of the function keys, i.e., redial key R, function termination key F, intercom key INT, flash key R, memory key H, and one touch dial keys A, B and C.

Figure 3:
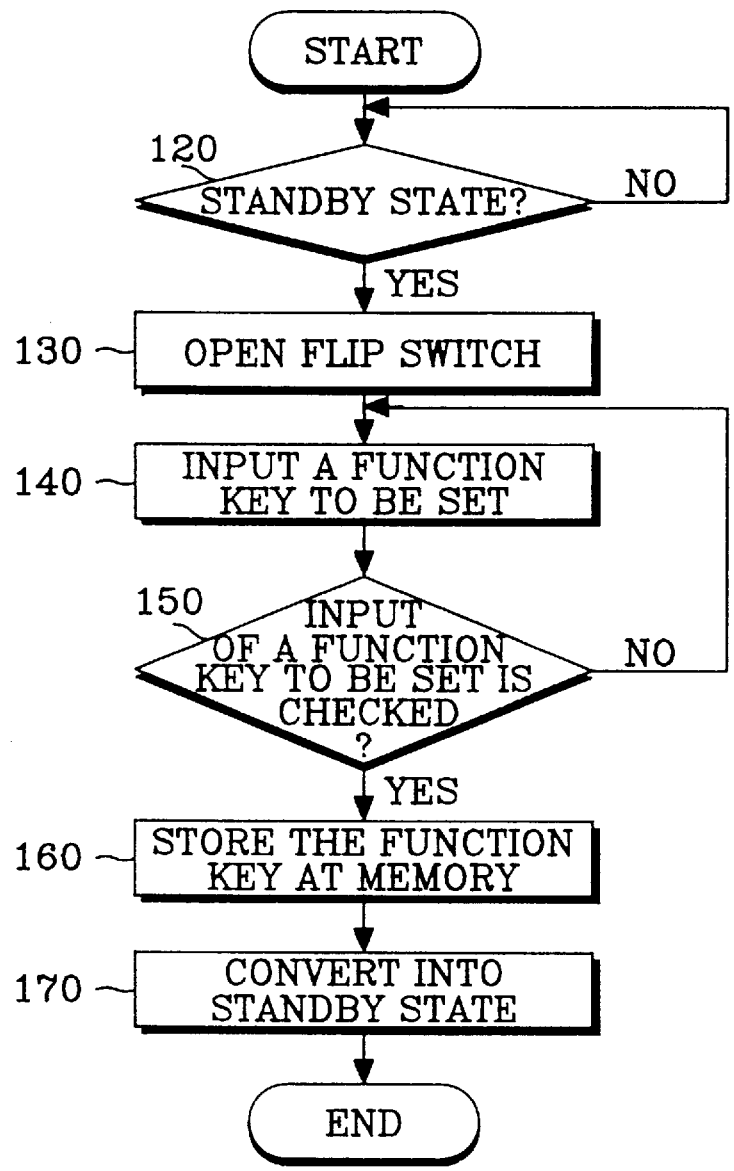
FIG. 3 is a flow chart illustrating a call key setup mode for setting a call key function according to the principles of the present invention.

Referring now to FIG. 3, step 120 indicates that a user can not assign another function to the call key unless handset 100 is initially in a standby state, i.e., not busy. Accordingly, controller 30 checks in step 120, the state of handset 100 to determine if it is in a standby state. Once it is determined that handset 100 is in a standby state, the user opens the flip which in turn opens flip switch 50, step 130. Accordingly, controller 30 detects the open state of flip switch 50 and releases handset 100 from the standby state. In step 140, the user activates one of the function keys and controller 30 checks, in step 150, for an input from one of desired ones of the function keys. According to the present invention it is desired to set the call key to additionally perform either a redial function or an intercom function for calling another telephone, i.e., a wired extension telephone, however, other known functions could also be utilized. When controller 30 determines the activated function key is one of the desired function keys, i e., intercom key INT or redial key R, the function of the activated function key is stored, step 160, in memory 40, and then, in step 170, controller 30 returns handset 100 back to the standby state.

Figure 4:
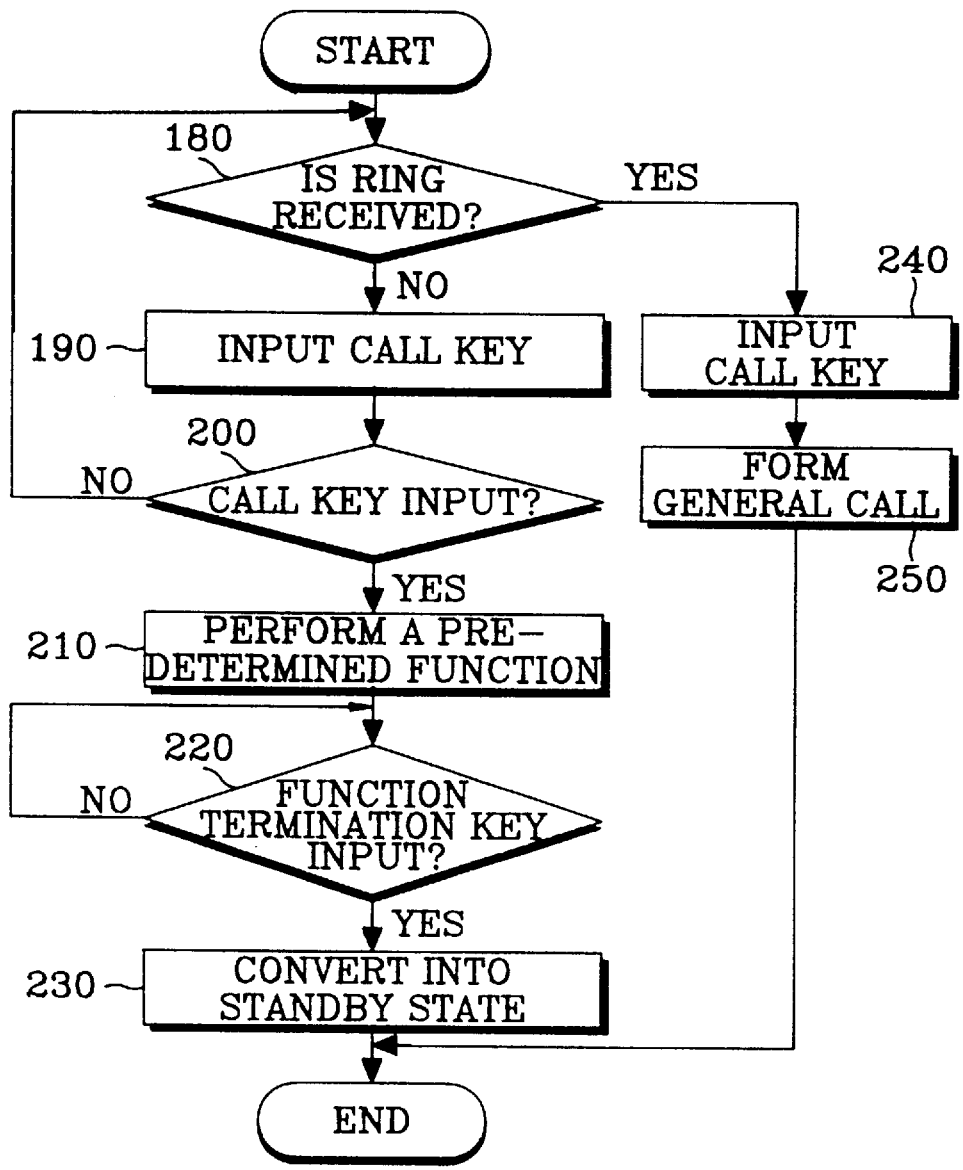
FIG. 4 is a flow chart for performing a function using the call key according to the principles of the present invention.

Once the call key has been set up according to the process of FIG. 3, the process of using the function assigned to the call key, as shown in FIG. 4, can be performed. While the flip of handset 100 is closed handset 100 is in a standby state, i.e., on-hook, and a call placed to the cordless telephone will cause a ringer (not shown) to ring. Accordingly, controller 30 checks in step 180 whether a ring signal indicating a call is received. When the ring signal is received, controller 30 activates the ringer. In order to answer the call the user needs only to activate the call key, step 240, is and controller 30 will form a general call, step 250, by establishing a talk connection between the calling party and handset 100.

When no ring signal has been received in step 180, controller 30 checks, step 200, for user input (or activation), step 190, of the call key during the standby (on-hook) state. When it is determined in step 200 that the call key has been input, controller 30 performs the function stored in memory 40, step 210. In step 220, controller 30 checks whether function termination key F is input. When it is determined that function termination key F is input, controller 30 converts the present state of the handset into the standby state in step 230.

As described above, according to the present invention, a call key is variably converted to an intercom key or to a redial key by a user's simple manipulation of the call key, thereby implementing various functions without opening a flip.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A cordless telephone handset, comprising:
    a keypad of numeric keys and function keys and a flip for covering and protecting said keypad;
    a call key having a call answering function;
    a flip switch having an on-hook position and an off-hook position;
    a controller for controlling modes of operation of said handset; and
    a memory for storing a second function assigned to said call key;
    said controller establishing a talk connection between said handset and a caller when a ring signal is received by said handset while said flip switch is in said on-hook position and a user of said handset activates said call key to perform said call answering function;
    said controller controlling said handset to perform said second function when no ring signal is received by said handset while said flip switch is in said on-hook position and said user activates said call key.

2. The handset as set forth in claim 1, comprised of said controller providing one of an intercom function and a redial function as said second function.

3. A method of performing more than one function by activating a call key of a handset for a cordless telephone, comprised of:
    with said handset having a keypad comprised of separate numeric keys and function keys, a flip covering said keypad while said flip is in a closed position, and a flip switch having an on-hook position while said flip is in said closed position and an off-hook position while said flip is in an open position, and a call key having a call answering function, establishing a talk connection between said handset and a caller when a ring signal is received by said handset while said flip switch is in said on-hook position and a user of said handset activates said call key to perform said call answering function; and
    controlling said handset to perform a second function when no ring signal is received by said handset while said flip switch is in said on-hook position and said user activates said call key.

4. The method as set forth in claim 3, said step of controlling said handset to perform a second function comprising the steps of:
    detecting when said handset is in a standby state;
    positioning said flip switch in said off-hook position when said handset is in said standby state;
    activating one of said function keys;
    determining whether the activated one of said function keys corresponds to one of a plurality of functions desired to be stored in a memory; and
    storing the function of said activated one of said function keys in said memory as said second function when it is determined that said activated one of said function keys corresponds to said one of a plurality of functions desired to be stored in said memory.

5. The method as set forth in claim 3, said step of controlling said handset to perform a second function comprising the steps of:

determining whether said handset has received a ring signal;

checking for activation of said call key when it is determined that no ring signal has been received;

performing said second function when said checking step determines that said call key has been activated;

checking for an input from a function termination key; and converting a state of said handset into a standby state when said input from said function termination key is detected.

6. The method as set forth in claim 4, said step of controlling said handset to perform a second function further comprising the steps of:

converting a state of said handset into a standby state when said function of said activated one of said function keys is stored in said memory;

determining whether said handset has received a ring signal;

checking for activation of said call key when it is determined that no ring signal has been received;

performing, as said second function, said stored function of said activated one of said function keys when said checking step determines that said call key has been activated.

7. The method as set forth in claim 6, further comprising the steps of:

checking for an input from a function termination key; and converting a state of said handset into a standby state when said input from said function termination key is detected.

8. A method of performing more than one function by activating a call key of a handset for a cordless telephone, comprised of:

detecting when said handset is in a standby state, said handset having a keypad comprised of separate numeric keys and function keys, a flip covering said keypad while said flip is in a closed position, and flip switch having an on-hook position while said flip is in said closed position and an off-hook position while said flip is in an open position, and a call key having a call answering function;

opening said flip and positioning said flip switch in said off-hook position when said handset is in said standby state;

activating one of said function keys;

determining whether the activated one of said function keys corresponds to one of a plurality of functions desired to be stored in a memory; and storing the function of said activated one of said function keys in said memory as a second function of said call key when it is determined that said activated one of said function keys corresponds to said one of a plurality of functions desired to be stored in said memory.

9. The method as set forth in claim 8, further comprising the steps of:

converting a state of said handset into a standby state when said function of said activated one of said function keys is stored in said memory;

determining whether said handset has received a ring signal;

checking for activation of said call key when it is determined that no ring signal has been received;

performing, as said second function, said stored function of said activated one of said function keys when said checking step determines that said call key has been activated.

10. The method as set forth in claim 8, further comprising the steps of:

converting a state of said handset into a standby state when said function of said activated one of said function keys is stored in said memory;

determining whether said handset has received a ring signal;

activating said call key when said ring signal is received; and establishing a talking link between a caller and said handset when said call key is activated during reception of said ring signal.

11. The method as set forth in claim 9, further comprising the steps of:

activating said call key when said ring signal is received; and establishing a talking link between a caller and said handset when said call key is activated during reception of said ring signal.

* * * * *